April 19, 1932.  J. WENK  1,854,820
ELECTRIC THERMALLY RESPONSIVE CONTROLLING MECHANISM
Filed July 9, 1930
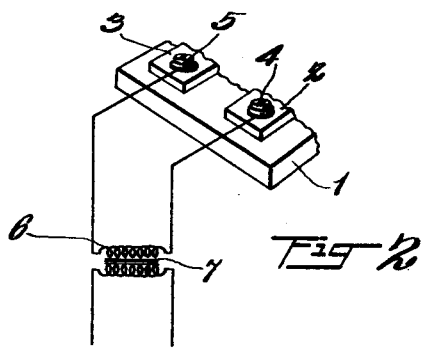
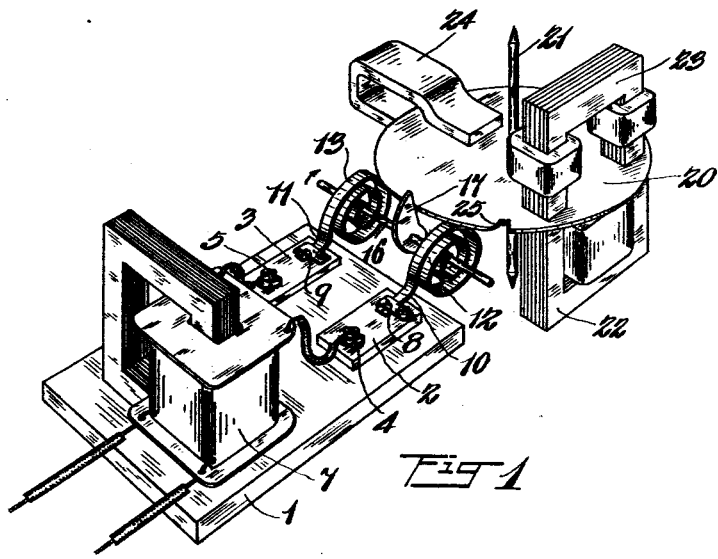
INVENTOR
J. Wenk.
BY
John D Morgan
ATTORNEY Patented Apr. 19, 1932

1,854,820

UNITED STATES PATENT OFFICE

JUAN WENK, OF MADRID, SPAIN, ASSIGNOR TO LANDIS & GYR, A-G., OF ZUG, SWITZERLAND, A CORPORATION OF SWITZERLAND

ELECTRIC THERMALLY RESPONSIVE CONTROLLING MECHANISM

Application filed July 9, 1930, Serial No. 466,870, and in Switzerland July 23, 1929.

The invention relates to new and useful improvements in electrically-operated motion controlling devices and method, and more particularly to a novel motion-controlling mechanism which is thermally responsively governed, and in certain of its features the invention is especially applicable to electrically-impelled mechanisms, and to a method utilizing the same.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 1 is an isometric perspective view of a mechanism embodying the invention; and Fig. 2 is a diagrammatic view of a transformer included in a control circuit.

The invention provides controlling means for a moving mechanism, said means having a thermally-responsive governing member, which is preferably in an electrical control current circuit, the changes in the circuit affecting the temperature of the governing member and thereby effecting the desired control of the moving mechanism.

The invention finds a wide field of usefulness and applicability in the control of electrically-driven devices, and especially electricity measuring devices, such as multiple or special tariff meters. Instances of such special applications are to tariff meters so calibrated that rotation of the meter disc is permitted only after a certain quantity of energy has been consumed, for only during a certain predetermined time of the day.

In accordance with certain features of the invention, the thermally-responsive governing member is in the control current circuit, the movement of the thermally-responsive member, caused by heating and cooling thereof due to current conditions of the circuit, actuates a controlling device which governs the driven mechanism. Further, in the preferable form of the invention, the controlling device is directly connected to, and is actuable from the movement of, the thermally-responsive member, which movement is caused by temperature changes arising out of the current conditions in the controlling circuit.

It will be understood that the foregoing general description, and the following detailed description as well, are exemplary and explanatory of the invention, but are not restrictive thereof.

A control of the kind described, operating on the novel principle of controlling a moving or driven mechanism by temperature changes in a controlling circuit has the advantages of a simple mechanism and very sensitive direct control, low watt consumption, high torque, small size and economical production.

Referring now to the exemplary embodiment illustrated in the accompanying drawings, a base 1 of insulating material is provided, and mounted thereon are two conducting contact plates 2 and 3, connected respectively to the two branches of the controlling current circuit or other suitable electrical circuit. In said embodiment the adaptation to an alternating current circuit is shown, the contact plates 2 and 3 being connected respectively by terminals 4 and 5 to the secondary side 6 of a transformer 7 in the control current circuit. In said preferred embodiment of the invention, two thermally-responsive members are provided, which are likewise preferably in the form of spirals, comprising bi-metallic strips, consisting of suitable metals having different coefficients of expansion. Furthermore, in the present prefered embodiment, the controlling device is carried directly by the thermally-responsive, movable element, and acts directly as a stop. Accordingly, two bi-metallic strips 12 and 13 are arranged in spiral form, and are mounted upon, and electrically-connected at their respective outer ends 10 and 11 with, corresponding terminals 8 and 9 upon the contact plates 2 and 3, already described. Fixed to the inner ends of both the bi-metallic strips 12 and 13 is a shaft 16, and by such mounting, and the spiral arrangement of the members 12 and 13, the movement of the shaft 16 will be a slight rocking movement, or partial rotation, resultant upon temperature changes in said bi-metallic strips.

The controlling device is preferably mounted directly upon shaft 16, or like movable member, so that the movement due to the action of the bi-metallic strips under temperature changes, will directly actuate the controlling device 17 to govern the controlled mechanism. The control may be effected by direct mechanical means, or by an electric switch, or otherwise. As embodied, a control device of the first-mentioned sort is exemplarily shown. The controlled mechanism, as illustrated, comprises a meter disc 20, fixed on a spindle 21, which is driven by suitable means, such as current coil 22 and pressure coil 23, and is controlled by any suitable brake magnet 24. A suitable device is provided on the meter disc to coact with the detent 17 or other control device. For this purpose a notch 25 is shown in the periphery of meter disc 20, and the detent or controlling device 17 is adapted, under the control of the thermally-responsive bi-metallic coils, to pass into and out of engagement with the notch 25 to permit or to prevent rotation of the meter.

In the operation of the exemplarily described embodiment, at the closing of the control current circuit, for example, by means of a contact clock time switch, or through a load current relay, there will occur, after a short time interval, a contraction of the bi-metal coil strips 12 and 13 in the direction of the arrow shown in the drawings, due to the difference in the expansion of the two metals in a well-known manner. Thereby a slight rotation of the shaft 16 is effected, and therewith a corresponding movement of the controlling device 17. The detent 17 thereby moves into engagement with the perimeter of the meter disc 20 and will then move into the slot 25 and thus stop the meter. In the assumed case, there will be no further registration of the consumed energy, due to the mechanical stoppage of the meter. After the lapse of a predetermined period of time, or after a certain load has been exceeded, dependent upon the purpose and connections of the specific device, the control current circuit is again interrupted through suitable switching means, or other control, and thereby the thermally-responsive members 12 and 13 will begin to cool and to return to their original position. As the cooling proceeds, a slight reverse rotation of the shaft 16 will be effected, and the control device 17 will pass out of engagement with the notch 25 and the meter will again begin to register. It will be clear, of course, that by a simple rearrangement of parts the starting and stopping of the control mechanism with respect to the heating and cooling of the thermally-responsive members could be reversed.

In accordance with a modification of the invention, the spiral bi-metallic springs are connected in series with the electric meter. When so connected, the meter disc 20 is free to rotate only when the current passing through the springs 12 and 13 and meter is sufficient to cause the control device 17 to be moved by the heating of the springs.

It will be understood that changes can be made from the exact form and mechanism herein exemplarily shown and described, within the scope of the accompanying claims, without departing from the principles of the invention and without sacrificing its chief advantages.

What I claim is:—

1. A control device including in combination a control current circuit, a plurality of spiral thermally-responsive members heated by the current, a control device mounted on said spiral members and moved by them to effect the desired controlling action.

2. A control device including in combination a control current circuit, a plurality of spiral thermally-responsive members in and heated by the current, a control device mounted on said spiral members and moved by them to effect the desired controlling action.

3. A control device including in combination a control current circuit, a plurality of spiral thermally-responsive members heated by the current, a control device comprising a shaft mounted on said spiral members and a device on said shaft rockable into and out of controlling position.

4. A control device including in combination a control current circuit, a plurality of spiral thermally-responsive members heated by the current, a control device comprising a shaft mounted on said spiral members and a detent on said shaft and rockable with the shaft to prevent and permit motion of the controlled mechanism.

5. The combination with an electricity meter having a rotatable element of a controlling device therefor comprising a detent movable into engagement with the rotatable element to stop rotation thereof, and a bi-metal strip for moving said detent.

6. The combination with a meter having a rotatable element of a controlling device therefor comprising a detent movable into and out of engagement with the rotatable element to stop rotation thereof and a thermally responsive member operatively connected with said detent for moving it.

7. A control apparatus for a meter having a rotatable element including in combination a control current circuit, a thermally responsive device in said circuit and heated by the current in said circuit and means for controlling the rotation of said rotatable element by engagement therewith and mounted on said thermally responsive device for movement thereby.

8. A control apparatus for a meter having a rotatable element including in combination a detent and a pair of bimetal spiral springs arranged side by side by and between which said detent is movably mounted whereby said detent is moved into and out of contact with the rotatable element on changes of temperature to control the rotation thereof.

In testimony whereof I have signed my name to this specification.

JUAN WENK.